No. 735,039. PATENTED JULY 28, 1903.
J. O'MEARA.
VALVE.
APPLICATION FILED MAR. 26, 1902.
NO MODEL.
Fig. 3. Fig. 1. Fig. 2.
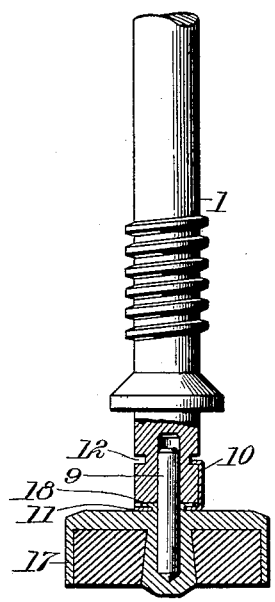
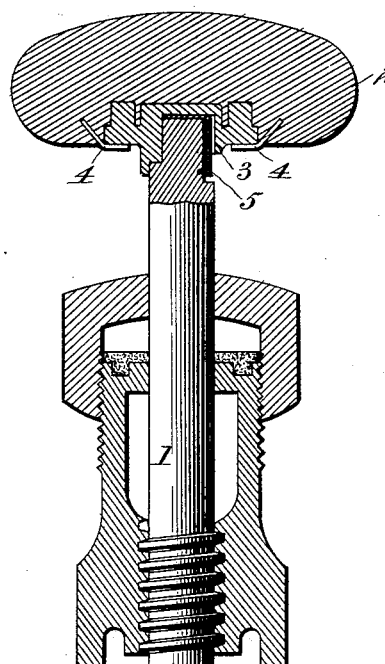
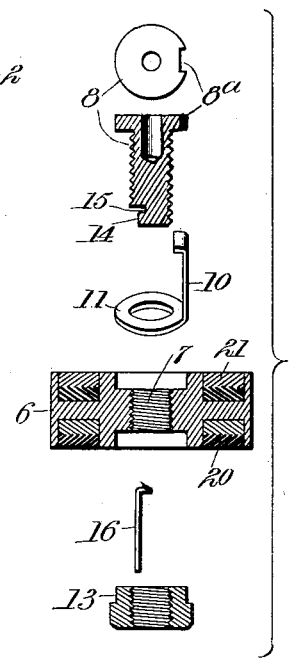
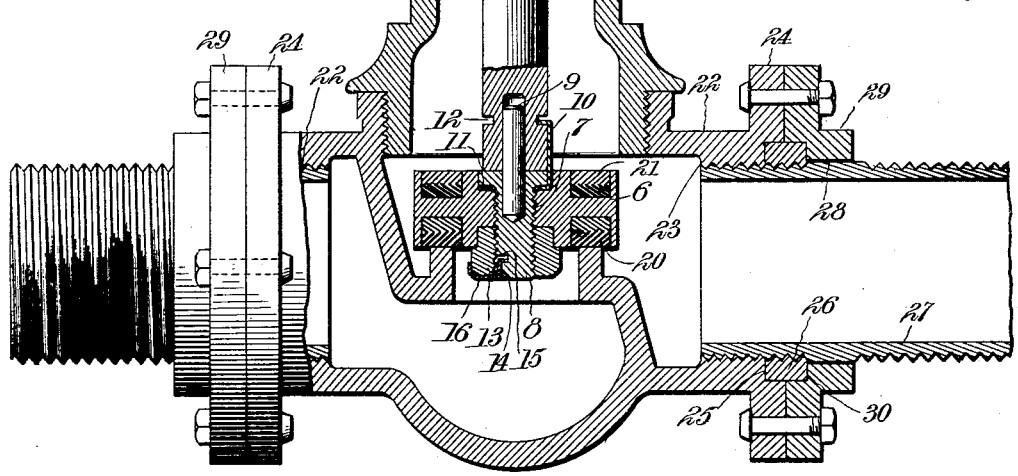
Fig. 4.
Witnesses
Inventor.
Jeremiah O'Meara
by Wm H Finckel
Atty.
THE NORRIS PETERS CO., PHOTO-LITHO., WASHINGTON, D. C.

No. 735,039. Patented July 28, 1903.

UNITED STATES PATENT OFFICE.

JEREMIAH O'MEARA, OF NEW YORK, N. Y., ASSIGNOR TO THE O'MEARA VALVE COMPANY, OF JERSEY CITY, NEW JERSEY, A CORPORATION OF NEW JERSEY.

VALVE.

SPECIFICATION forming part of Letters Patent No. 735,039, dated July 28, 1903.

Application filed March 26, 1902. Serial No. 100,115. (No model.)

*To all whom it may concern:*

Be it known that I, JEREMIAH O'MEARA, a citizen of the United States, residing at New York, in the county of New York and State of New York, have invented a certain new and useful Improvement in Valves, of which the following is a full, clear, and exact description.

This invention relates to certain features applicable to globe, angle, and other valves for use in steam, hot and cold water, and other systems, and has for its objects, first, to provide a fastening for uniting the knob, handle, or hand-wheel to the valve-stem; second, to swivel the valve-disk to its stem by an efficient but displaceable connection; third, to provide a double-faced packing, and, fourth, to provide an interchangeable screw-threaded or flanged joint for connecting the valve-shell with piping, capable also of resisting the ill effects of contraction and expansion. In attaining these several objects I employ pins, obliquely sunk in the material of the knob, handle, or hand-wheel and adapted to be bent over the metal plate, which is borne by the stem and to which the knob, handle, or hand-wheel is applied. I have shown two ways in which to swivel the valve-disk to its stem, in both of which a spring-hook is applied to the disk and adapted to engage a groove in the stem. In one instance the spring-hook is detachably connected with the disk and in the other instance it is permanently applied thereto. It is extremely desirable, especially in valves of considerable size, to have a packing, one face of which may be used, for example, for steam or other hot fluids, and the other may be used for cold fluids, and to this end I harden one face only of a rubber or equivalent vulcanizable compound, so as to adapt it for use with steam and hot fluids, and leave the other face soft or comparatively soft, so as to provide for its use with cold fluids, and such packing will be found extremely useful in making repairs. In those instances where it is desirable to apply a valve to pipes by a screw-threaded joint it is advisable to provide against the ill effects of expansion and contraction. Instances are on record where pipes united to valve-shells by screw-threaded joints have been pulled out of the shells by their contraction, serving to strip the threads. To remedy this, I provide the valve-shell with flanged shoulders having internal screw-threads, so that the valve may be applied to pipes by means of combined screw-threaded and flanged joints, and in such case the pipes may have their screw-threaded shoulders provided with a screw-collar and a slip-flange, adjusted thereon by said collar and bolted to the flange of the valve casing or shell.

In the accompanying drawings, illustrating my invention, in the several figures of which like parts are similarly designated, Figure 1 is a vertical section of a globe-valve comprising the several features of the invention. Fig. 2 shows, detached, the various parts constituting one form of swivel connection of the disk with its stem. Fig. 3 is a partial sectional elevation illustrating another form of swivel connection. Fig. 4 is a half-section and elevation of a two-part packing.

So far as the body of the valve, the valve-seat, the bonnet, the gland, and packing are concerned they may be of any ordinary or approved construction and the stem 1 may be connected with the bonnet by a screw-thread, substantially as shown, or otherwise.

As herein shown, the knob, handle, or hand-wheel 2 has a plate 3 sunk in it and secured thereto by oppositely-arranged pins 4, which are sunk in the material of the knob, handle, or hand-wheel obliquely and their outer ends bent back upon the plate to lock said plate and knob 2 securely together.

The plate and the valve-stem may be connected by a spring-catch 5, substantially as in my Patent No. 668,881, dated February 26, 1901.

The valve-disk 6, as shown in Figs. 1 and 2, has a screw-threaded hub 7 to receive a screw 8, and this screw and the adjacent portion of the stem are perforated longitudinally to receive a pin 9, by which the disk and the stem are connected against lateral displacement. A spring-hook 10, rising from a ring 11, is applied to the disk by said ring encircling the shank of the screw 8 and engaging its head. The hook portion 10 projects above the disk and is held from turning by engaging a notch 8ᵃ in the head of screw 8. The bill of the hook snaps into a circumferential groove 12 in the valve-stem in order to connect the disk and the stem against longitudinal displacement. These two devices connecting the disk and stem admit of the disk being swiveled to the stem, so that in the opening and closing of the valve the disk will not be revolved upon the seat, and thus the disk and its packing are saved from abrasion. In order to lock the screw 8 in place in the disk, I provide a nut 13 to engage the screw-threaded shank of the screw, and in order to lock this nut against turning I prefer to slab off one end of the screw, as shown at 14 in Fig. 2, and cut a transverse notch 15 in the screw and place in said slabbed portion and notch the fastening device, such as a bit of flat wire or flat sheet metal 16, and then bend the projecting end of this fastening device over the head of the nut, as shown in Fig. 1, this fastening device being an adaptation of the fastening device forming the subject of my Patent No. 668,882, dated February 26, 1901; but in its place any other suitable nut-lock may be employed. The means just described for swiveling the disk to its stem are especially applicable to reversible valve-disks or those valve-disks which have packing in both faces and which may be turned upside down when one face is worn, thus avoiding the necessity of replacing the disk or replacing the packing. By this construction of disk connection the disk may be applied and removed at pleasure not only from the stem, but also from the spring-hook.

In those valve-disks which have a single face, such as shown in Fig. 3, the disk 17 has a central portion socketed to receive the pin 9, as before, and there is a tubular projection 18, surrounding the socket in the disk, which is turned down over the ring portion 11 of the spring-hook 10, which engages a circumferential groove 12 in the stem. In this case the tubular projection 18 is upset after the manner of an eyelet over the ring 11 and makes a permanent fastening of the spring-hook to the disk.

I have found that rubber or rubber composition packing-rings may be made with a hard face on one side and a soft face on the other by applying a vulcanizing heat to one face and protecting the other face from such heat, and, as shown in Fig. 4, I may make packing-rings with a hard face 20 and with a soft face 21, so that the user need carry but one kind of packing-rings in stock in order to be able to supply such packing-rings for service in an installation for hot fluids, as well as for an installation for cold fluids.

Referring to Figs. 1 and 2, it will be seen that a reversible valve-disk may have such packing-rings applied to it and that one face may have the hard side of the packing-ring exposed, while in the other face the soft side of the packing-ring may be exposed.

The shoulders 22 of the valve shell or casing may be provided with the usual internal screw-threads 23 and in addition the laterally-projecting flanges 24, so as to adapt the valve for making screw-threaded joints and also for making flanged joints or, and especially, for making a combined screw-threaded and flanged joint. For use in connection with flanged joints I prefer to provide the faces of the flanges 24 with recesses 25 in order to receive a collar 26, which may be screw-threaded upon or otherwise applied to the pipe 27. In the case of the use of such a screw-collar I prefer to leave a portion 28 of the pipe unthreaded in order to provide a stop for the collar. The complemental flange 29 is provided with a recess 30 to engage the collar 26, and said flange 29, preferably, is not screw-threaded, but is merely slipped over the pipe up against the collar and is then bolted to the flange 24 by suitable bolts, as usual, with or without packing material interposed between the flanges. The point of novelty in this feature of my invention is the provision of a valve with screw-threads in its shoulders for application in the usual manner to screw-threaded pipes and also with flanges by which it may be connected up with the pipes by a flanged joint as distinguished from a screw-threaded joint or whereby a combined screw-threaded and flanged joint may be made, so as to overcome the tendency of the contracting pipes to pull away and strip the screw-threads.

The construction of the combined screw-threaded and flanged joint is especially useful where the united parts, or especially the valve and the pipe, are of different metals, one relatively softer than the other.

Any number or all of the various improvements herein set forth may be combined in a single valve.

What I claim is—

1. The combination with a valve-knob, handle or hand-wheel, of a plate 3, and pins 4, sunk obliquely in said knob, handle or hand-wheel adjacent the periphery of the said plate and having their outer ends bent down upon said plate and thereby securing said plate to said knob, handle or hand-wheel without the intervention of other fastenings, substantially as described.

2. A valve-stem, having a circumferential groove, combined with a valve-disk having a spring-hook applied thereto and adapted to engage the groove in the stem, and means to prevent lateral displacement of the stem and disk and thereby complete the swivel connection of the disk with the stem.

3. A valve-stem, having a circumferential groove, a reversible valve-disk, a screw applied to said disk, a spring-hook engaged by said screw and in turn engaging the groove in the stem, and means to prevent lateral displacement of the disk.

4. A valve-stem, having a circumferential groove, a reversible valve-disk, a screw applied to said disk, a spring-hook engaged by said screw and in turn engaging the groove in the stem, and means to prevent lateral displacement of the disk, combined with a lock-nut applied to said screw.

5. A packing-ring of vulcanizable composition, having one face hard and the other soft.

6. A valve-shell, having an internally-screw-threaded shoulder 22, and a laterally-projecting flange 24, on said shoulder, provided with a recess 25, combined with an externally-screw-threaded pipe adapted to engage the internal screw-thread of the shoulder, a collar 26 threaded on said pipe, and a flange 29 placed upon the pipe and recessed at 30 and secured to the flange 24, the collar 26 being received in the recesses in the flanges.

7. A valve-shell, having an internally-screw-threaded shoulder, a recessed flange projecting laterally from said shoulder, and a recessed flange adapted to be applied to said flange on the shoulder, combined with an externally-screw-threaded pipe, a screw-threaded collar 26 on said pipe and embraced by the recesses in the flanges, and a stop 28 on the pipe for said collar.

In testimony whereof I have hereunto set my hand this 21st day of March, A. D. 1902.

JEREMIAH O'MEARA.

Witnesses:
JOHN D. HOUSTON,
JOHN W. LANE, Jr.